United States Patent
David et al.

(10) Patent No.: US 10,795,892 B1
(45) Date of Patent: Oct. 6, 2020

(54) EVALUATING COLLIDING DATA RECORDS

(71) Applicant: AMERICAN EXPRESS TRAVEL RELATED SERVICES COMPANY, INC., New York, NY (US)

(72) Inventors: Vincent Julien David, Port Washington, NY (US); Yogaraj Jayaprakasam, Phoenix, AZ (US); Daniel Reznik, Staten Island, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 393 days.

(21) Appl. No.: 15/810,866

(22) Filed: Nov. 13, 2017

(51) Int. Cl.
*G06F 7/02* (2006.01)
*G06F 16/23* (2019.01)
*G06F 16/2455* (2019.01)

(52) U.S. Cl.
CPC .......... *G06F 16/2456* (2019.01); *G06F 7/023* (2013.01); *G06F 16/2365* (2019.01)

(58) Field of Classification Search
CPC ... G06F 16/2456; G06F 16/2365; G06F 7/023
See application file for complete search history.

(56) References Cited

U.S. PATENT DOCUMENTS

| 6,631,365 B1* | 10/2003 | Neal | G06F 16/313 |
| | | | 707/690 |
| 2003/0014383 A1* | 1/2003 | Cho | G06F 16/313 |
| 2011/0313978 A1* | 12/2011 | Chatterjee | G06Q 10/06 |
| | | | 707/690 |
| 2013/0031089 A1* | 1/2013 | Allen | G06F 16/95 |
| | | | 707/723 |
| 2014/0032373 A1* | 1/2014 | Tierney | G06Q 40/02 |
| | | | 705/26.81 |
| 2014/0244300 A1* | 8/2014 | Bess | G06F 16/22 |
| | | | 705/3 |
| 2014/0279947 A1* | 9/2014 | Chachra | G06F 16/215 |
| | | | 707/691 |
| 2015/0161664 A1 | 6/2015 | Koppelmann | |

(Continued)

OTHER PUBLICATIONS

Vincent Julien David, et al., U.S. Appl. No. 15/810,917, filed Nov. 13, 2017, titled "Detecting and Updating Duplicate Data Records," 47 pages.

(Continued)

*Primary Examiner* — Jorge A Casanova
(74) *Attorney, Agent, or Firm* — Thomas Horstemeyer, LLP (57) ABSTRACT

Systems, methods, and articles of manufacture for evaluating colliding data records are provided. The system may ingest one or more data inputs from one or more data sources. The system may parse the data inputs and determine whether the data is preexisting in the system. In response to the data input and stored data at least partially conflicting (e.g., colliding), the system may generate a candidate dataset based on the data input and the stored data. The candidate dataset may comprise two or more data candidates comprising permutations of the data values in the data input and the stored data. The system may evaluate each data candidate, score each date candidate based on the evaluation, and determine the data candidate having the greatest score.

20 Claims, 4 Drawing Sheets

(56) References Cited

U.S. PATENT DOCUMENTS

2016/0070743 A1\* 3/2016 Myslinski ............ G06F 16/244
707/690
2017/0236094 A1 8/2017 Shah

OTHER PUBLICATIONS

International Search Report and Written Opinion dated Jun. 26, 2019 in PCT Application PCT/US19/26812.
Vincent Julien David, et al., U.S. Appl. No. 15/951,010, filed Apr. 11, 2018, titled "Data Enrichment Environment Using Blockchain".

\* cited by examiner

EVALUATING COLLIDING DATA RECORDS

FIELD

The disclosure relates to systems for transferring and evaluating colliding data records in a data processing environment.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. Data processing environments may ingest data from hundreds of data sources with each data source transmitting hundreds of thousands of records. The data sources may be certified data sources having typically high quality data, or uncertified data sources having lower quality data.

When ingesting data, the data processing environment may typically store data records that are new to the environment (e.g., data records that do not preexist). In response to receiving a data record that at least partially matches a preexisting stored data record, the data processing environment may attempt to enrich or update the preexisting stored data with the new information from the incoming data record. However, problems may occur when the new data record "collides" with the stored data record (e.g., data values in the new data record conflict with the data values in the stored data record). This problem may be aggravated when ingesting data records from uncertified data sources that may have low quality data.

SUMMARY

Systems, methods, and articles of manufacture (collectively, the "system") for evaluating colliding data records are disclosed. The system may generate a candidate data set having at least two data candidates, wherein each data candidate comprises a permutation of data values from a data input and a stored data. The system may evaluate each data candidate based on at least one evaluation factor. The system may generate a candidate record score for each data candidate, wherein the candidate record score is based on the evaluation. The system may compare the candidate record score for each data candidate to determine the data candidate having the greatest candidate record score.

In various embodiments, the system may also receive the data input, wherein the data input comprises at least one data value corresponding to at least one data field; and retrieve the stored data, wherein the stored data comprises at least one stored data value corresponding to at least one stored data field, and wherein the stored data is retrieved by at least partially matching the data value of the data input with the stored data value of the stored data.

In various embodiments, the data candidates in the candidate dataset may be generated based on generation logic comprising logical operations to intelligently combine the data value of the data input with the stored data value of the stored data based on at least one of machine learning, predefined weight logic, a data source reputation, a predefined weight, or metadata in the data value or the stored data. The data candidates may be evaluated based on evaluation logic comprising logical operations to evaluate each data candidate. The data candidates may be evaluated based on at least one reference datasheet. The candidate record score may be generated by weighting each logical operation used to evaluate each data candidate.

In various embodiments, the data candidate having the greatest candidate record score is transmitted to a data structure and stored as an updated stored data in a format accessible by data consumers.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any logical order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure provides a system, method, and article of manufacture (collectively, "the system") for evaluating colliding data records in a data processing environment. The system may intelligently combine data records arriving from one or more data sources with different data qualities to enrich the stored data record and to at least partially reduce the storage of incorrect data. As used herein, "colliding", "collision", or the like between data records may refer to data records having similar types of data or similar data fields, but having conflicting data values for similar data fields. For example, a first data record for "Business1" may comprise data indicating a state of "New York" and a zip code of "10001". A second data record may be ingested for "Business1" that comprises data indicating a state of "New York", a city of "New York City", and a zip code of "10001", or the second data record may be ingested for "Business 1" that comprises data indicating a state of "New York", a city of "New York City", and a zip code of "10002." In that regard, the system may determine how to collide the first data record and the second data record to produce an accurate data record having a high data quality. In that respect, a data collision event may occur in response to new data being ingested from an existing data source; an update in a data source requires an update of the data record; or an incoming data record conflicts with data values in a stored data record.

Figure 1:
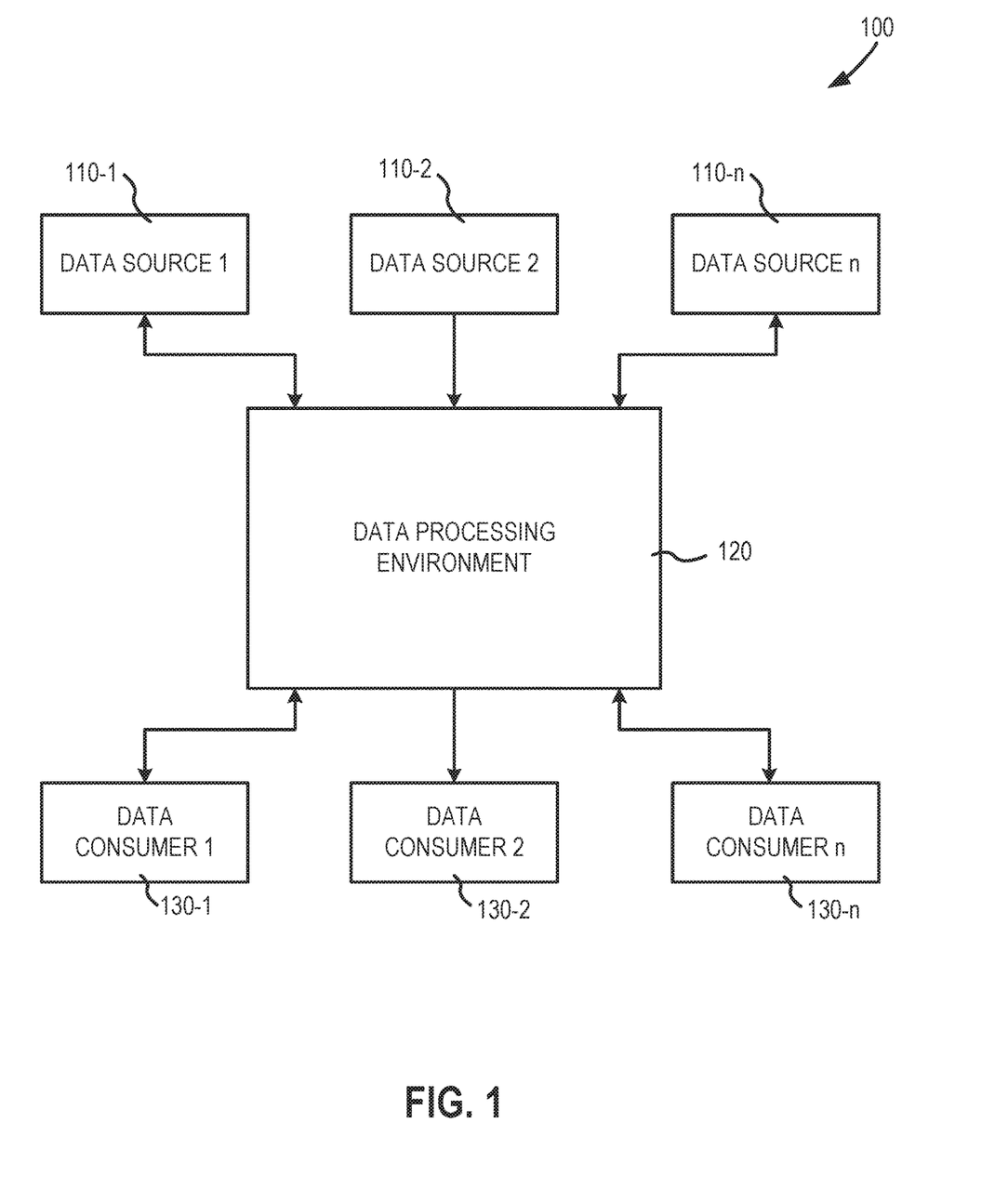
FIG. 1 is a block diagram illustrating various system components of a system for evaluating colliding data records, in accordance with various embodiments.

The system further improves the functioning of the computer (e.g., data processing environment 120, with brief reference to FIG. 1). For example, by automating the evaluation of colliding data records as opposed to needing the user to manually evaluate and input data, the user performs less computer functions and provides less input, which saves on data storage and memory, thus speeding processing in the computer. Moreover, by at least partially reducing the need for user input, the speed of evaluating, transforming, and storing data may be increased. Additionally, by transmitting, storing, and accessing data using the processes described herein, the security of the data is improved, which decreases the risk of the computer or network, or the data itself (including confidential data) from being compromised. The present disclosure may further allow data consuming systems to benefit and receive data from a variety of data providers without having to adopt and/or account for the data provider's format and quality. In that regard, the present disclosure may limit the impact on downstream consumer systems from low quality data received from one or more data providers, thus at least partially increasing uptime of consumer systems and decreasing related development costs.

In various embodiments, and with reference to FIG. 1, a system 100 for evaluating colliding data records is disclosed. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, system 100 may comprise one or more data sources 110, a data processing environment 120, and/or one or more data consumers 130. The various systems and components described herein may be in direct logical communication with each other via a bus, network, and/or through any other suitable means, or may be individually connected as described further herein.

In various embodiments, system 100 may comprise any suitable number of data sources 110, such as, for example, a first data source 110-1, a second data source 110-2, and/or an "Nth" data source 110-n. Each data source 110-1, 110-2, 110-n may be in logical and/or electronic communication with data processing environment 120. Each data source 110-1, 110-2, 110-n may be configured to transmit input data (e.g., data records, unformatted data, formatted date, etc.) to data processing environment 120. In various embodiments, data sources 110-1, 110-2, 110-n may comprise any source of data existing in system 100, and/or any other suitable system environment. For example, each data source 110-1, 110-2, 110-n may comprise data related to financial and/or transactional systems and processes, such as, for example, a merchant submission system, a settlement database, an accounts receivable database, an accounts payable database, and/or the like. Moreover, the data may be structured or unstructured.

In various embodiments, data sources 110-1, 110-2, 110-n may be part of a big data environment, and each data source 110-1, 110-2, 110-n may transmit hundreds of thousands of records. As used herein, "big data" may refer to partially or fully structured, semi-structured, or unstructured data sets including millions of rows and hundreds of thousands of columns. A big data set may be compiled, for example, from a history of purchase transactions over time, from web registrations, from social media, from records of charge ("ROC"), from summaries of charges ("SOC"), from internal data, invoice level data, supplier level data, and/or from other suitable sources. Big data sets may be compiled without descriptive metadata such as column types, counts, percentiles, or other interpretive-aid data points. As discussed further herein, the big data sets may be stored in various big-data storage formats containing millions of records (i.e., rows) and numerous variables (i.e., columns) for each record. A record of charge (or "ROC") may comprise any transaction or transaction data. The ROC may be a unique identifier associated with a transaction. Record of Charge (ROC) data includes important information and enriched data. For example, a ROC may contain details such as location, merchant name or identifier, transaction amount, transaction date, account number, account security pin or code, account expiry date, and the like for the transaction. Such enriched data increases the accuracy of matching the transaction data to the receipt data. Such enriched ROC data is not equivalent to transaction entries from a banking statement or transaction account statement, which may typically be limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by one or more members using a transaction account, such as a transaction account associated with a gift card, a debit card, a credit card, and the like. In various embodiments, the big data may also comprise data corresponding to accounts payable.

In various embodiments, data processing environment 120 may be configured to ingest data input from data sources 110-1, 110-2, 110-n; parse, transform, and store the data input (as discussed further herein); and provide the data input to downstream data consumers (e.g., a first data consumer 130-1, a second data consumer 130-2, and/or an "Nth" data consumer 130-n). Data processing environment 120 may be configured to process hundreds of thousands of records from a single data source. Data processing environment 120 may also be configured to ingest data from hundreds of data sources. System 100 may comprise any suitable number of data consumers. Each data consumer 130-1, 130-2, 130-*n* may comprise any suitable consumer of data existing in system 100, and/or any other suitable system environment. Each data consumer 130-1, 130-2, 130-*n* may be in electronic and/or operable communication with data processing environment 120.

Data processing environment 120 may comprise any suitable system, module, environment, or the like. For example, data processing environment 120 may comprise a distributed file system. An exemplary distributed file system may comprise a distributed computing cluster configured for parallel processing and storage. Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

In various embodiments, data processing environment 120 may comprise one or more systems, components, modules, data structures, or the like configured to aide in the ingesting, transformation, parsing, and storing of data inputs. For example, and with reference to FIG. 2, data processing environment 120 may comprise one or more of a data input module 140, a data formatting module 142, a data storage 147, a candidate generation module 150, an evaluation engine 155, or the like. The various systems, components, modules, and data structures of data processing environment 120 may comprise logical or virtual partitions of one or more systems, or may each comprise independent processors, components, data structures, or the like. The various systems, components, modules, and data structures of data processing environment 120 may be in direct logical communication with each other via a bus, network, and/or through any other suitable means, or may be individually connected as described further herein.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

A network may be unsecured. Thus communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

In various embodiments, data input module 140 may be configured as a central hub for access to various components, databases, and modules of data processing environment 120. In that respect, data input module 140 may be configured to ingest data input (e.g., from data sources 110-1, 110-2, 110-*n*, with brief reference to FIG. 2) and parse the data input to determine one or more data values. Data input module 140 may also query data storage 147 to determine whether the data input was previously received and stored in data storage 147 and transmit the data input for storage in data storage 147 in response to not locating a match in data storage 147. In response to locating a partial match in data storage 147, data input module 140 may also be configured to transmit the data input to candidate generation module 150. Data input module 140 may be in electronic and/or logical communication with data formatting module 142, data storage 147, candidate generation module 150, and/or evaluation engine 155. Data input module 140 may comprise any suitable computer system, processor, or the like capable of receiving data and performing operations. Data input module 140 may include one or more processors and/or one or more tangible, non-transitory memories and be capable of implementing logic. In various embodiments, data input module 140 may comprise a processor configured to implement various logical operations in response to execution of instructions, for example, instructions stored on a non-transitory, tangible, computer-readable medium.

Figure 2:
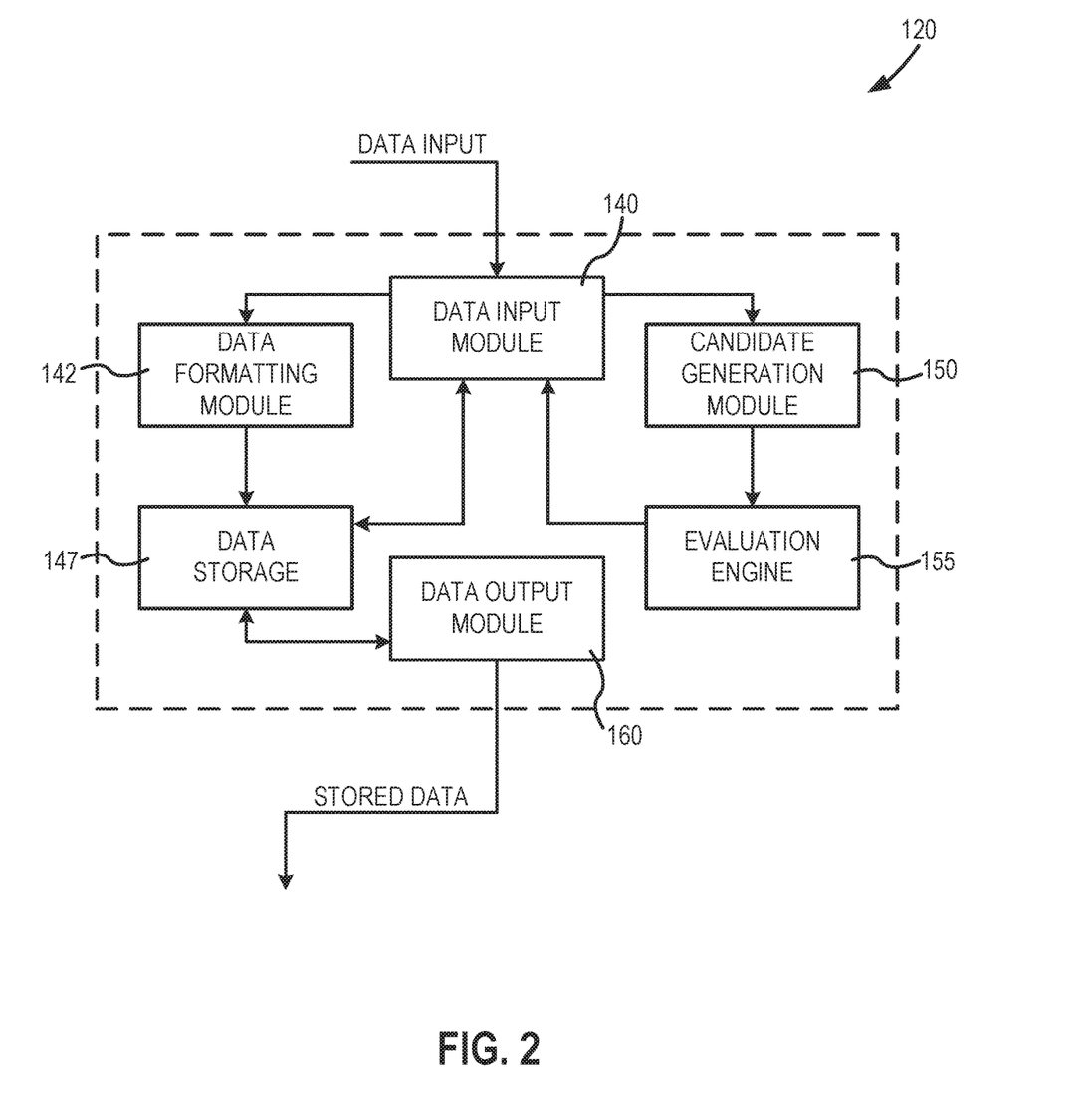
FIG. 2 is a block diagram illustrating an exemplary data processing environment for a system for evaluating colliding data records, in accordance with various embodiments.

In various embodiments, data formatting module 142 may be configured to receive, transform, and/or format data for storage in data storage 147. In that respect, data formatting module 142 may receive data from data input module 140, perform transformations to format the data, and transmit the formatted data to data storage 147 for storage. The transformation may comprise a series of logical steps to alter some or all of the data, such as, for example, data formatting steps (such as to stripping white space and truncating numbers to a predetermined length), logical formatting steps, and/or the like as discussed herein or known in the art. Data formatting module 142 may be in electronic and/or logical communication with data input module 140 and/or data storage 147. Data formatting module 142 may comprise any suitable computer system, processor, or the like capable of receiving data and performing operations. Data formatting module 142 may include one or more processors and/or one or more tangible, non-transitory memories and be capable of implementing logic. In various embodiments, data formatting module 142 may comprise a processor configured to implement various logical operations in response to execution of instructions, for example, instructions stored on a non-transitory, tangible, computer-readable medium.

In various embodiments, data storage 147 may be configured to receive data from data input module 140 and/or data formatting module 142 and store and maintain the data. Data storage 147 may store and maintain the data using any suitable technique discussed herein or known in the art. Data storage 147 may be in electronic and/or logical communication with data input module 140, data formatting module 142, and/or data output module 160. Data storage 147 may comprise any suitable database, data structure (e.g., virtual or physical), flat file structure, or the like, as discussed herein or known in the art. Data storage 147 may be organized in any suitable manner, for example, as data tables or lookup tables. Each record may be a single file, a series of files, a linked series of data fields or any other data structure.

In various embodiments, candidate generation module 150 may be configured to receive data from data input module 140. Candidate generation module 150 may ingest the data and generate a candidate dataset, as discussed further herein. Candidate generation module 150 may implement generation logic to generate the candidate dataset. Candidate generation module 150 may transmit the generated candidate dataset to evaluation engine 155. Candidate generation module 150 may be in electronic and/or logical communication with data input module 140 and/or evaluation engine 155. Candidate generation module 150 may comprise any suitable computer system, processor, or the like capable of receiving data and performing operations. Candidate generation module 150 may include one or more processors and/or one or more tangible, non-transitory memories and be capable of implementing logic. In various embodiments, candidate generation module 150 may comprise a processor configured to implement various logical operations in response to execution of instructions, for example, instructions stored on a non-transitory, tangible, computer-readable medium.

In various embodiments, evaluation engine 155 may be configured to receive the candidate dataset from candidate generation module 150. Evaluation engine 155 may be configured to evaluate the candidate dataset and generate one or more candidate record scores based on the evaluation, as discussed further herein. Evaluation engine 155 may implement evaluation logic while evaluating the candidate datasets. In that respect, evaluation engine 155 may also comprise one or more data tables to aid in the evaluation. In response to determining a candidate record having the greatest candidate record score, evaluation engine 155 may be configured to transmit that candidate record to data input module 140. Evaluation engine 155 may be in electronic and/or logical communication with data input module 140 and/or candidate generation module 150. Evaluation engine 155 may comprise any suitable computer system, processor, or the like capable of receiving data and performing operations. Evaluation engine 155 may include one or more processors and/or one or more tangible, non-transitory memories and be capable of implementing logic. In various embodiments, evaluation engine 155 may comprise a processor configured to implement various logical operations in response to execution of instructions, for example, instructions stored on a non-transitory, tangible, computer-readable medium.

In various embodiments, data output module 160 may be configured to retrieve stored data from data storage 147 and transmit the stored data to one or more data consumers (e.g., data consumers 130-1, 130-2, 130-n, with brief reference to FIG. 1). Data output module 160 may be configured to transmit the stored data in response to a data request, system event, or the like. Data output module 160 may be in electronic and/or logical communication with data output module 160. Data output module 160 may comprise any suitable computer system, processor, or the like capable of receiving data and performing operations. Data output module 160 may include one or more processors and/or one or more tangible, non-transitory memories and be capable of implementing logic. In various embodiments, data output module 160 may comprise a processor configured to implement various logical operations in response to execution of instructions, for example, instructions stored on a non-transitory, tangible, computer-readable medium.

Figure 4:
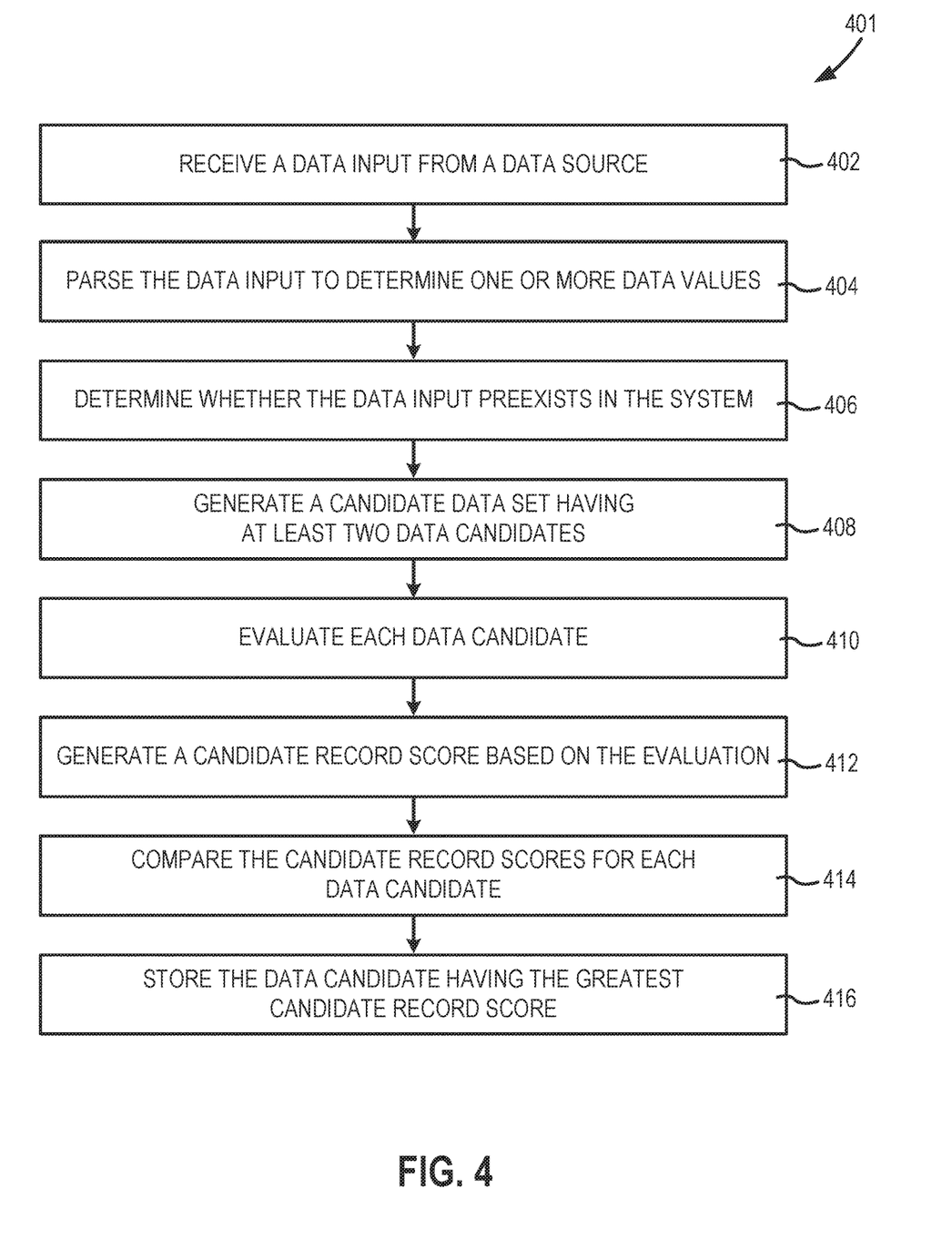
FIG. 4 illustrates a process flow for a method of evaluating colliding data records, in accordance with various embodiments.

Referring now to FIG. 4, the process flows depicted are merely embodiments and are not intended to limit the scope of the disclosure. It will be appreciated that the following description makes appropriate references not only to the steps and elements depicted in FIG. 4, but also to the various system components as described above with reference to FIGS. 1 and 2.

Figure 3A:
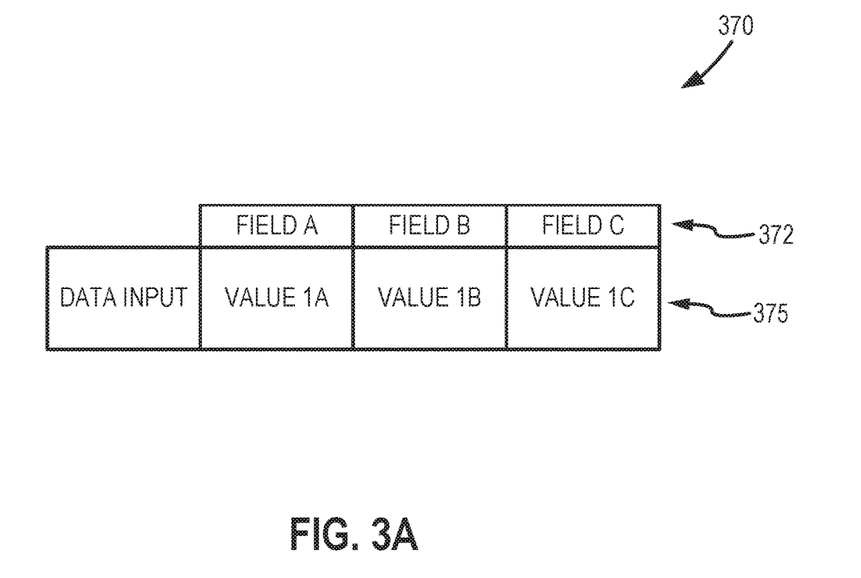
FIG. 3A illustrates an exemplary data input, in accordance with various embodiments.

In various embodiments, and with specific reference to FIG. 4, a method 401 for secured account provisioning is disclosed. Method 401 may comprise receiving a data input from a data source (step 402). Data processing environment 120 may receive the data input from one or more of data source 110-1, data source 110-2, data source 110-n, or the like. For example, data input module 140 may be configured to receive the data input from data sources 110-1, 110-2, 110-n. Each data source 110-1, 110-2, 110-n may be a certified (e.g., a data source of known origin having high quality data) or uncertified data source (e.g., a data source of unknown origin having typically lower quality data) and may provide data inputs having varying qualities (e.g., missing data values, grammatical errors, etc.). Method 401 may comprise parsing the data input to determine one or more data values (step 404). Data input module 140 in data processing environment 120 may be configured to parse the data input in response to receiving the data input. Data input module 140 may parse the data input to determine one or more data values in the data input. For example, and with brief reference to FIG. 3A, each data input 370 may comprise one or more data values 372 corresponding to one or more data fields 375. For example, data input 370 may comprise a value 1A corresponding to a field A, a value 1B corresponding to a field B, a value 1C corresponding to a field C, and/or the like. In various embodiments, the one or more data fields 375 may be known to data input module 140. For example, each data source **110-1, 110-2, 110-*n* may format and transmit the data input with metadata, tags, or the like indicating the type of each data field. Data processing environment 120 may receive and recognize each metadata, tag, or the like to determine the type of data fields present in the data input. For example, field A may correspond to a "Business Name", field B may correspond to a "Last Name", field C may correspond to an "Address", etc. In that respect, parsing the data input to determine the data values of known data fields may enable data input module 140 to intelligently determine whether the data input preexists in data processing environment 120**, as discussed further herein.

With reference again to FIG. 4 and FIGS. 1 and 2, and in accordance with various embodiments, method 401 may comprise determining whether the data input preexists in the system (step 406). Data input module 140 may be configured to determine whether the data input preexists in data processing environment 120. For example, data input module 140 may be configured to query data storage 147 to determine whether data storage 147 comprises the data input. For example, data input module 140 may query data storage 147 based on the data source (e.g., data source 110-1, 110-2, or **110-*n*), based on the parsed data value of a known data field, and/or through any other method. Data input module 140 may attempt to match the data using any suitable technique or matching algorithm, including commercial algorithms using machine learning, geolocation, metadata matching, or the like. In response to determining that data storage 147 does not comprise the data input, data input module 140 may be configured to transmit the data input to data storage 147 for storage. For example, each data input may be assigned a key field, as discussed further herein, and the storage locations may be determined based on or according to the key field. In response to determining a match between the data input and stored data, data input module 140 may be configured to transmit the data input and the matching stored data to candidate generation module 150**.

In various embodiments, method 401 may comprise generating a candidate data set having at least two data candidates (step 408). In response to candidate generation module 150 receiving the data input and the stored data from data input module 140, candidate generation module 150 may be configured to generate the candidate data set. The candidate data set may comprise the data input and the stored data, and at least two data candidates. Each data candidate may comprise a permutation of the data values comprised in the data input and the stored data. For example, and with brief reference to FIG. 3B, a candidate data set 380 may comprise one or more logical parts. Candidate data set 380 may comprise a data part 385 comprising all of the data values from the data input and the stored data. Candidate data set may also comprise a timestamps part 390, comprising a timestamp corresponding to each data value in data part 385. The timestamp may be assigned to each data value via metadata, tags, pointers, or through any other association. For example, each timestamp in timestamps part 390 may comprise a time, a day, a year, or the like from which the data value was received by data processing environment 120. For example, data values corresponding to the data input may also comprise the same timestamp, as the data values were received into data processing environment 120 at the same time (e.g., "TIME 3"). In that regard, the timestamp for each data value in the data input may be generated and assigned to the data value (e.g., via metadata, tags, pointers, etc.) at the time the data input is received into data processing environment 120. As a further example, data values corresponding to the stored data may comprise the same or different timestamps corresponding to whether any of the data values were previously updated after the data was stored (e.g., "TIME 1" and "TIME 2").

Figure 3B:
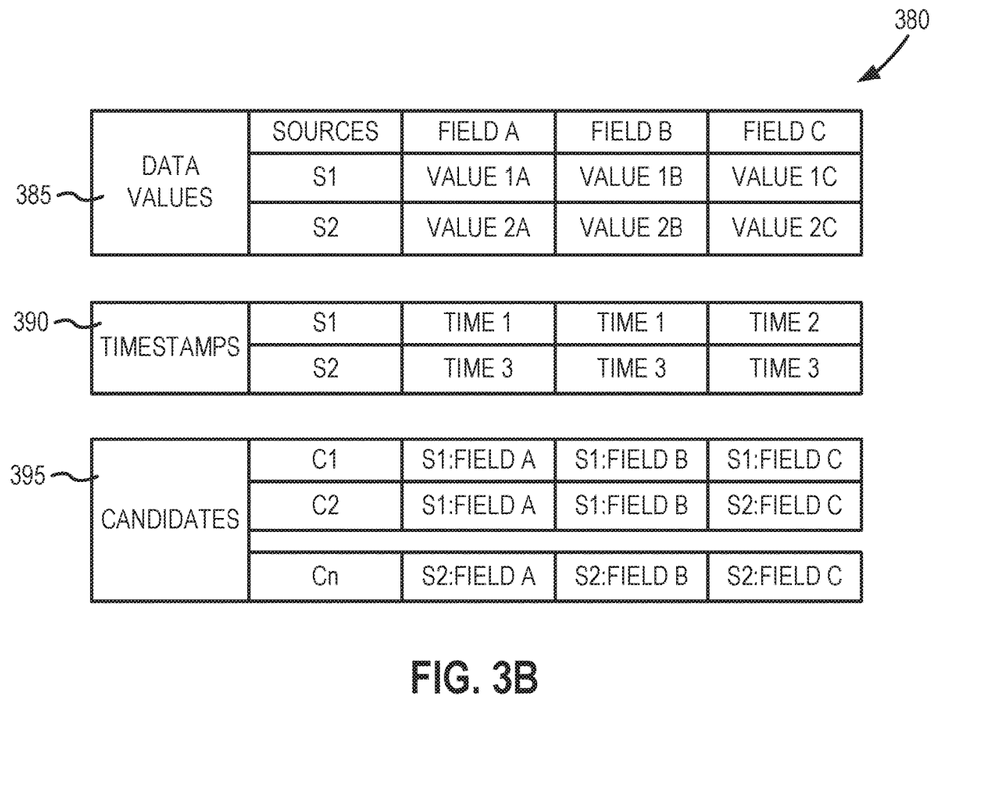
FIG. 3B illustrates an exemplary candidate data set, in accordance with various embodiments.

Candidate data set 380 may also comprise a candidate part 395 comprising one or more data candidates. Each data candidate may be given a unique identifier (e.g., C1, C2, Cn, etc.). The unique identifier may be randomly generated or may be generated and assigned based on the order of candidate generation. Each data candidate may comprise data indicating the data value of each source to assign to each data field. For example, a data candidate C1 may comprise data indicating the data value in Field A of source s1 (e.g., "S1:FIELD A") for the value of Field A, data indicating the data value in Field B of source s1 (e.g., "S1:FIELD B") for the value of Field B, and data indicating the data value in Field C of source s1 (e.g., "S1:FIELD C") for the value of Field C. In various embodiments, a data candidate may be generated for each possible permutation of the data input and the stored data. In various embodiments, and as discussed further herein, generation of each data candidate may be intelligently controlled.

In various embodiments, and with reference again to FIG. 4 and FIGS. 1 and 2, candidate generation module 150 may implement generation logic to generate the data candidates. The generation logic may enable candidate generation module 150 to intelligently permutate and combine the data values from the data input and the stored data while generating the data candidates. For example, the generation logic may be configured to remove and/or prevent the combination of data values and generated data candidates that logically should not be combined. In that regard, the generation logic may enable intelligent permutations and combinations based on the metadata of each data value, and/or through any other suitable means. For example, wherein the data fields of the data input and the stored data are known, the generation logic may comprise operations based on that knowledge. For example, a data candidate may be generated having one or more addresses (e.g., a primary address and a secondary address or an alternative address), one or more phone numbers, one or more email addresses, or the like; data values in data fields for "Business Name" and "Address" may be intelligently permutated and combined, but data values in data fields for "First Name" and "Last Name" may not be permutated and combined; and/or the like. As a further example, the generation logic may also ensure that a prefix is not incorrectly combined with a first name (e.g., "Mrs" combined with "Mark"); that latitudes and longitudes are not cross mixed; that currency and amounts are only combined together; that temperature and units are only combined together; and/or the like. In various embodiments, generation logic may also comprise any other suitable logical operations to control permutations and combining the data input and the stored data. In that respect, the maximum number of possible permutations may not be generated for a given candidate dataset. In response to generating the candidate dataset, candidate generation module 150 may transmit the candidate dataset to evaluation engine 155.

In various embodiments, method 401 may comprise evaluating each data candidate (step 410). Evaluation engine 155 may be configured to evaluate each data candidate in response to receiving the candidate dataset from candidate generation module 150. In that respect, evaluation engine 155 may be configured to evaluate each data candidate to determine the data candidate having the highest data quality, accuracy, and/or the like. Evaluation engine 155 may implement evaluation logic to intelligently evaluate the data candidates based on one or more evaluation factors. For example, evaluation engine 155 may evaluate each data candidate based on the data values in known data fields. The evaluation logic may comprise operations to evaluate the data based on one or more factors, such as: spelling or grammatical errors; numerical values in a data field such as "First Name," "Last Name," "City," "State," "Country," or the like; a data field such as "First Name," "Last Name," "City," "State," "Country," or the like starting with a lowercase; logical inconsistencies with a "Zip Code," "State," "City," or "Country" data value and a latitude and/or longitude value; a "Zip Code" syntax matching a "Country;" repeating characters (e.g., aaaa@aaaaaa.com in an "Email" data field, 555-5555-5555 in a "Phone Number" data field, etc.); recognizable keyboard sequences (e.g., "asdfg," "jkl," "12345," etc.); and/or the like. Evaluation engine 155 may also evaluate the data candidate based on the timestamp of each data value (e.g., an older data value may be out of date). Evaluation engine 155 may also comprise one or more reference datasets. For example, evaluation engine 155 may comprise a name reference datasheet comprising common first names, last names, and/the like to compare against the data values. As a further example, evaluation engine 155 may comprise a zip code to state reference datasheet comprising a list of zip codes corresponding to each state. In that respect, data values in a "Zip Code" field may be evaluated against data values in a "State" field for accuracy. Similarly, data values in a "State" field may be referenced in the datasheet for accuracy.

In various embodiments, method 401 may comprise generating a candidate record score based on the evaluation (step 412). Evaluation engine 155 may be configured to generate the candidate record score in response to completing evaluation of each data candidate (or simultaneously with the evaluation). The candidate record score may comprise a value indicating the accuracy, data quality, or the like of each data candidate based on the evaluation of each data candidate. In that respect, the candidate record score may enable evaluation engine 155 to rank each data candidate to determine the best data candidate. The candidate record score may comprise any suitable ranking system or range, such as, for example, 0.0-1.0, 0-1000, 0-10000, A-Z, or the like.

In various embodiments, evaluation engine 155 may apply a weight to each logical operation of the evaluation logic. For example, evaluation engine 155 may apply a feed weight (e.g., the data input is received from a known or trusted data source), a base weight (e.g., the data field is preassigned a weight), a confidence weight (e.g., a data field comprises a data value, or is empty), a trained weight (e.g., data fields are weighted based on machine learning or the like), or any other suitable weight. For example, logic evaluating the timestamp may be given a low weight compared to logic comparing data values in a "Zip Code" field against data values in a "State" field. Grammatical or formatting errors, such as a numerical value in a "Last Name" field, an incorrectly formatted zip code (e.g., a zip code data value having three numbers), or the like may be given a high weight. Each logical operation may comprise any suitable weight. Moreover, and in accordance with various embodiments, evaluation engine 155 may apply a weight in response to the data input coming from a known or trusted data source (e.g., data source reputation). For example, wherein the data source is a certified data source, weight may be given to data values extracted from the data input during the evaluation process. In various embodiments, wherein the data source is a certified data source for a particular data field (e.g., the data source is certified to have high quality data regarding "Business Name"), the data value extracted from that data field may be given a weight. In various embodiments, a manual weight may be preselected and applied to one or more known data fields (e.g., evaluations on data from a "Business Name" field may be weighted heavier than an evaluation on data from a "Last Name" field).

In various embodiments, method 401 may comprise comparing the candidate record scores of each data candidate (step 414). Evaluation engine 155 may compare the candidate record scores to determine the data candidate having the greatest candidate record score. Method 401 may comprise storing the data candidate having the greatest candidate record score (step 416). Evaluation engine 155 may transmit the data candidate to data input module 140. Data input module 140 may transmit the data candidate to data storage 147 for storage. In various embodiments, data input module 140 may also transmit the data candidate to data formatting module 142 for formatting (as discussed further herein), prior to being transmitted to data storage 147. In that respect, the data candidate may be stored as an updated stored data. In various embodiments, the updated stored data may be stored and formatted in a format accessible by downstream data consumers. In that regard, the present disclosure may receive data inputs having varying quality and formats from varying sources, and provide data outputs (e.g., stored data) having a higher quality and format accessible to downstream data consumers.

The disclosure and claims do not describe only a particular outcome of evaluating colliding data records, but the disclosure and claims include specific rules for implementing the outcome of evaluating colliding data records and that render information into a specific format that is then used and applied to create the desired results of evaluating colliding data records, as set forth in *McRO, Inc.* v. *Bandai Namco Games America Inc.* (Fed. Cir. case number 15-1080, Sep. 13, 2016). In other words, the outcome of evaluating colliding data records can be performed by many different types of rules and combinations of rules, and this disclosure includes various embodiments with specific rules. While the absence of complete preemption may not guarantee that a claim is eligible, the disclosure does not sufficiently preempt the field of evaluating colliding data records at all. The disclosure acts to narrow, confine, and otherwise tie down the disclosure so as not to cover the general abstract idea of just evaluating colliding data records. Significantly, other systems and methods exist for evaluating colliding data records, so it would be inappropriate to assert that the claimed invention preempts the field or monopolizes the basic tools of evaluating colliding data records. In other words, the disclosure will not prevent others from evaluating colliding data records, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include alerting a subscriber when their computer is offline. With brief reference to FIG. 1, system 100 may include generating customized information, via data processing environment 120, and alerting a remote subscriber that the information can be accessed from their computer (e.g., via data consumers 130). The alerts are generated by filtering received information, building information alerts and formatting the alerts into data blocks based upon subscriber preference information. The data blocks are transmitted to the subscriber's wireless device (e.g., data consumers 130), which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface (e.g., via data consumers 130) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

As used herein, "transmit" may include sending electronic data from one system component to another over a network connection. Additionally, as used herein, "data" may include encompassing information such as commands, queries, files, data for storage, and the like in digital or any other form.

Phrases and terms similar to "transaction account" may include any account that may be used to facilitate a financial transaction. For example, a transaction account as used herein may refer to an account associated with an open account or a closed account system (as described herein). The transaction account may exist in a physical or non-physical embodiment. For example, a transaction account may be distributed in non-physical embodiments such as an account number, frequent-flyer account, telephone calling account, and/or the like. Furthermore, a physical embodiment of a transaction account may be distributed as a financial instrument, such as, for example, a credit card, debit card, and/or the like.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA® system developed by AMAZON®. ALEXA® is a cloud-based voice service that can help with tasks, entertainment, general information and more. All AMAZON® ALEXA® devices, such as the AMAZON® Echo, AMAZON® Dot, AMAZON® Tap, AMAZON® Fire TV, have access to the ALEXA® Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all ALEXA®-enabled devices.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook® message, Twitter® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale ("POS") devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security ("TLS"). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB by MAPR®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, and U.S. application Ser. No. 15/785,870 titled API REQUEST AND RESPONSE BALANCING AND CONTROL ON BLOCKCHAIN and filed on Oct. 17, 2017, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server ("MTS"), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object ("ADO") compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages ("ASP"), common gateway interface scripts ("CGI"), extensible markup language ("XML"), dynamic HTML, cascading style sheets ("CSS"), AJAX (Asynchronous JAVASCRIPT And XML), helper applications, plug-ins, and the like. A server may include a web service that receives a request from a web server, the request including a URL and an IP address (10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server.

Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as APACHE® Pig, C, C++, C #, APACHE® Hive, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, Spark, Scala, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (0 unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   generating, by a computing device, a candidate data set comprising data values from a data input and a stored data, a timestamp corresponding to individual ones of the data values from the data input and the stored data, and at least two data candidates, wherein each data candidate comprises a unique identifier, a permutation of the data values from the data input and the stored data, and data indicating a data source of the individual ones of the data values from the data input and the stored data;
   determining, by the computing device, that the permutation of the data values from the data input and the stored data comprises a logical combination of respective ones of the data values from the data input and the stored data;
   evaluating, by the computing device, each data candidate based on at least one evaluation factor;
   generating, by the computing device, a candidate record score for each data candidate, wherein the candidate record score is based on the evaluation; and
   evaluating, by the computing device, the candidate record score for each data candidate to determine the data candidate having a greatest candidate record score.

2. The method of claim 1, further comprising:
   receiving, by the computing device, the data input, wherein the data input comprises at least one data value corresponding to at least one data field; and
   retrieving, by the computing device, the stored data, wherein the stored data comprises at least one stored data value corresponding to at least one stored data field, and wherein the stored data is retrieved by at least partially matching the at least one data value of the data input with the at least one stored data value of the stored data.

3. The method of claim 2, wherein the at least two data candidates in the candidate data set are generated based on generation logic comprising logical operations to intelligently combine the at least one data value of the data input with the at least one stored data value of the stored data based on at least one of machine learning, predefined weight logic, a data source reputation, a predefined weight, or metadata in the data input or the stored data.

4. The method of claim 2, wherein the at least two data candidates are evaluated based on evaluation logic comprising logical operations to evaluate each data candidate.

5. The method of claim 4, wherein the at least two data candidates are evaluated based on at least one reference datasheet.

6. The method of claim 4, wherein the candidate record score is generated by weighting each logical operation used to evaluate each data candidate.

7. The method of claim 1, wherein the data candidate having the greatest candidate record score is transmitted to a data structure and stored as an updated stored data in a format accessible by data consumers.

8. A system comprising:
   a processor; and
   a tangible, non-transitory memory configured to communicate with the processor, the tangible, non-transitory memory having instructions stored thereon that, in response to execution by the processor, cause a computing device comprising the processor and the non-transitory memory to perform operations comprising:

generating, by the computing device, a candidate data set comprising data values from a data input and a stored data, a timestamp corresponding to individual ones of the data values from the data input and the stored data, and at least two data candidates, wherein each data candidate comprises a unique identifier, a permutation of the data values from the data input and the stored data, and data indicating a data source of the individual ones of the data values from the data input and the stored data;

determining, by the computing device, that the permutation of the data values from the data input and the stored data comprises a logical combination of respective ones of the data values from the data input and the stored data;

evaluating, by the computing device, each data candidate based on at least one evaluation factor;

generating, by the computing device, a candidate record score for each data candidate, wherein the candidate record score is based on the evaluation; and evaluating, by the computing device, the candidate record score for each data candidate to determine the data candidate having a greatest candidate record score.

9. The system of claim 8, further comprising:

receiving, by the computing device, the data input, wherein the data input comprises at least one data value corresponding to at least one data field; and retrieving, by the computing device, the stored data, wherein the stored data comprises at least one stored data value corresponding to at least one stored data field, and wherein the stored data is retrieved by at least partially matching the at least one data value of the data input with the at least one stored data value of the stored data.

10. The system of claim 9, wherein the at least two data candidates in the candidate data set are generated based on generation logic comprising logical operations to intelligently combine the at least one data value of the data input with the at least one stored data value of the stored data based on at least one of machine learning, predefined weight logic, a data source reputation, a predefined weight, or metadata in the data input or the stored data.

11. The system of claim 9, wherein the at least two data candidates are evaluated based on evaluation logic comprising logical operations to evaluate each data candidate.

12. The system of claim 11, wherein the at least two data candidates are evaluated based on at least one reference datasheet.

13. The system of claim 11, wherein the candidate record score is generated by weighting each logical operation used to evaluate each data candidate.

14. The system of claim 8, wherein the data candidate having the greatest candidate record score is transmitted to a data structure and stored as an updated stored data in a format accessible by data consumers.

15. An article of manufacture including a non-transitory, tangible computer readable storage medium having instructions stored thereon that, in response to execution by a computer based system, cause the computer based system to perform operations comprising:

generating, by the computer based system, a candidate data set comprising data values from a data input and a stored data, a timestamp corresponding to individual ones of the data values from the data input and the stored data, and having at least two data candidates, wherein each data candidate comprises a unique identifier, a permutation of the data values from the data input and the stored data, and data indicating a data source of the individual ones of the data values from the data input and the stored data;

determining, by the computer based system, that the permutation of the data values from the data input and the stored data comprises a logical combination of respective ones of the data values from the data input and the stored data;

evaluating, by the computer based system, each data candidate based on at least one evaluation factor;

generating, by the computer based system, a candidate record score for each data candidate, wherein the candidate record score is based on the evaluation; and evaluating, by the computer based system, the candidate record score for each data candidate to determine the data candidate having a greatest candidate record score.

16. The article of manufacture of claim 15, further comprising:

receiving, by the computer based system, the data input, wherein the data input comprises at least one data value corresponding to at least one data field; and retrieving, by the computer based system, the stored data, wherein the stored data comprises at least one stored data value corresponding to at least one stored data field, and wherein the stored data is retrieved by at least partially matching the at least one data value of the data input with the at least one stored data value of the stored data.

17. The article of manufacture of claim 16, wherein the at least two data candidates in the candidate data set are generated based on generation logic comprising logical operations to intelligently combine the at least one data value of the data input with the at least one stored data value of the stored data based on at least one of machine learning, predefined weight logic, a data source reputation, a predefined weight, or metadata in the data input or the stored data.

18. The article of manufacture of claim 16, wherein the at least two data candidates are evaluated based on at least one of evaluation logic comprising logical operations to evaluate each data candidate, at least one reference datasheet.

19. The article of manufacture of claim 16, wherein the candidate record score is generated by weighting each logical operation used to evaluate each data candidate.

20. The article of manufacture of claim 15, wherein the data candidate having the greatest candidate record score is transmitted to a data structure and stored as an updated stored data in a format accessible by data consumers.

\* \* \* \* \*